(12) United States Patent
Gemello et al.

(10) Patent No.: US 9,505,267 B2
(45) Date of Patent: Nov. 29, 2016

(54) ROLLING BEARING, IN PARTICULAR VEHICLE HUB BEARING UNIT, HAVING A SEALING COVER

(71) Applicants: Marco Gemello, Nichelino Torino (IT); Giampaolo Magli, Turin (IT); Zhengjiang Wu, Pinerolo (IT)

(72) Inventors: Marco Gemello, Nichelino Torino (IT); Giampaolo Magli, Turin (IT); Zhengjiang Wu, Pinerolo (IT)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/830,852

(22) Filed: Aug. 20, 2015

(65) Prior Publication Data

US 2016/0059626 A1 Mar. 3, 2016

(30) Foreign Application Priority Data

Aug. 26, 2014 (IT) ............... TO2014A0680

(51) Int. Cl.
| | |
|---|---|
| *B60B 27/00* | (2006.01) |
| *F16C 33/72* | (2006.01) |
| *F16C 19/18* | (2006.01) |
| *F16C 33/76* | (2006.01) |
| *F16C 33/78* | (2006.01) |
| *F16C 41/00* | (2006.01) |

(52) U.S. Cl.
CPC ....... *B60B 27/0073* (2013.01); *B60B 27/0068* (2013.01); *F16C 33/723* (2013.01); *F16C 33/768* (2013.01); *F16C 33/783* (2013.01); *B60B 27/0005* (2013.01); *F16C 19/186* (2013.01); *F16C 41/007* (2013.01); *F16C 2326/02* (2013.01)

(58) Field of Classification Search
CPC .. F16C 33/723; F16C 33/783; F16C 33/768; F16C 41/007; F16C 2326/02; F16C 19/18; F16C 19/182; F16C 19/183; F16C 19/184–19/187; F16C 35/00; B60B 27/0073; B60B 27/0005; B60B 27/0068
See application file for complete search history.

(56) References Cited

U.S. PATENT DOCUMENTS

| | | | | |
|---|---|---|---|---|
| 5,148,104 | A | * 9/1992 | Ishikawa ................. | G01P 3/443 188/181 R |
| 5,172,984 | A | * 12/1992 | Lederman ............... | B60B 7/002 384/489 |
| 5,814,984 | A | 9/1998 | Ohmi et al. | |
| 8,176,799 | B2 | * 5/2012 | Kubokawa ............ | F16C 41/007 73/862.322 |
| 8,539,676 | B2 | * 9/2013 | Takada .................... | B60B 27/00 29/898.04 |

(Continued)

FOREIGN PATENT DOCUMENTS

| | | |
|---|---|---|
| DE | 202005005260 U1 | 6/2005 |
| EP | 1693676 A2 | 8/2006 |

(Continued)

*Primary Examiner* — Alan B Waits
(74) *Attorney, Agent, or Firm* — Bryan Peckjian; SKF USA Inc. Patent Dept.

(57) ABSTRACT

A rolling bearing constituting a vehicle hub bearing unit, including an outer ring, an inner ring, a plurality of rolling bodies interposed between the inner and outer rings, and a cover driven with axial and radial interference on a first end of the outer ring, which it fluid-tightly closes; wherein the cover is formed by a plastic made body, made of a synthetic plastic material, and by a cylindrical metal sleeve co-molded with the plastic made body; between the cover and the outer ring there being arranged an annular sealing element housed with axial clearance in a seat of the outer ring made at least in part on the radially inner surface of the outer ring; a sealant being arranged between the metal sleeve and the plastic body.

8 Claims, 3 Drawing Sheets

(56) References Cited

U.S. PATENT DOCUMENTS

| | | | |
|---|---|---|---|
| 9,259,964 B2* | 2/2016 | Mock | B60B 27/0068 |
| 2008/0031561 A1* | 2/2008 | Hakata | B60B 3/16 |
| | | | 384/544 |
| 2015/0010255 A1* | 1/2015 | Ishida | F16C 33/726 |
| | | | 384/476 |
| 2016/0009128 A1* | 1/2016 | Wakatsuki | F16C 33/723 |
| | | | 384/448 |

FOREIGN PATENT DOCUMENTS

| | | |
|---|---|---|
| JP | 2004052832 A | 2/2004 |
| JP | 2008105626 A | 5/2008 |
| JP | 2011174511 A | 9/2011 |
| JP | 2012087858 A | 5/2012 |
| JP | 2014052011 A | 3/2014 |

* cited by examiner

ROLLING BEARING, IN PARTICULAR VEHICLE HUB BEARING UNIT, HAVING A SEALING COVER

CROSS REFERENCE TO RELATED APPLICATIONS

This is a Non-Provisional patent application, filed under the Paris Convention, claiming the benefit of Italy (IT) Patent Application Number TO2014A000680, filed on 26 Aug. 2014 (26.08.2014), which is incorporated herein by reference in its entirety.

TECHNICAL FIELD OF THE INVENTION

The present invention relates to a rolling bearing, in particular to a vehicle wheel hub bearing unit, of the type provided with a sensor bearing element in the shape of a sealing cover coupled to the outer ring.

PRIOR ART

As known, for example from U.S. Pat. No. 5,814,984, rolling bearings constituting vehicle hub bearing units intended to equip non-driving wheels comprise an inner ring, rotating in use, equipped on the outboard side, i.e. on the side facing towards the outside of the vehicle, with a flange for mounting a vehicle wheel, an outer ring, stationary in use, e.g. fixed to a suspension of the vehicle, a plurality of rolling bodies interposed between the inner and outer rings, and a closing and sealing cover arranged on the inboard side, i.e. facing towards the inside of the vehicle, which closes an open annular end of the outer ring in fluid-tight manner. Such a cover is provided instead of the usual sealing assembly interposed on this side between the inner and outer rings in order to prevent the introduction of contaminants through the open end of the outer ring and, above all, to adequately support in protected manner a sensor adapted to detect the rotation speed of the vehicle wheel in cooperation with an element to be detected, also known as "phonic wheel", integrally carried by the inner ring within a closed chamber defined between the cover and the outer ring.

The cover is mounted integral with the outer ring, driven in axial abutment and by interference in the open end of the outer ring. For this purpose, the cover is formed by a cup-shaped body made of a synthetic plastic material co-molded onto a cylindrical metal sleeve, which defines at least one lateral radial coupling surface of the cover with the outer ring.

However, it has been found in hydraulic tightness tests with pressurized air that the interference coupling between cover and outer ring does not guarantee a complete sealing of the chamber in which the element to be detected is arranged and which is faced by the sensor carried by the cover. In particular, there are two paths of possible fluid leakage: a first path develops along the radial interference coupling surfaces between metal sleeve and outer ring and the axial shoulder coupling surfaces between the part of the cover defined by the plastic made cup-shaped body and a frontal surface of the open annular end of the outer ring; a second path develops along the coupling surfaces between the metal sleeve and the plastic made body, co-molded on the metal sleeve, because the normal co-molding techniques do not guarantee the absence of micro cracks in the metal/plastic interface.

Such a second path then flows into the first path at the axial shoulder coupling between the part of the cover defined by the synthetic plastic made cup-shaped body and the frontal surface of the open annular end of the outer ring.

In order to block possible leakages, U.S. Pat. No. 5,814,984 suggests to arrange an annular sealing element, in practice an o-ring, in series to both the first and second leakage paths, in practice by arranging the o-ring within a truncated-cone shape seat obtained on the open annular end of the outer ring between an inner radially lateral surface of the outer ring and the frontal surface of the open annular end of the outer ring so that the o-ring can exert a radial and axial sealing action between cover and outer ring at the same time.

This solution is not free from drawbacks. Indeed, the double sealing action that the o-ring is called to perform as a result of its mounting position produces an unpredictable, uncontrollable deformation which make it difficult to mount the cover on the outer ring but, above all, causes positioning errors, particularly axial positioning errors, of the cover with respect to the outer ring, and consequently of the sensor with respect to the element to be detected, thus producing a sometimes considerable decay of quality of the electrical signal produced by the sensor in use. JP 2011 174 511A does not solve these problems.

SUMMARY OF THE INVENTION

It is the object of the present invention to provide a rolling bearing, in particular of a vehicle wheel hub unit, of the type provided with a sensor bearing element in the shape of a sealing cover coupled to the outer ring, such as that of U.S. Pat. No. 5,814,984, but free from the drawbacks highlighted and in which any possible leakage of fluid along the two described possible paths is eliminated at the same time without needing to adopt special co-molding techniques to obtain one of the cover or other technical complex and economically costly solutions.

According to the invention, a rolling bearing is thus provided, in particular a vehicle wheel hub bearing unit, of the type provided with a sensor bearing element in the shape of sealing cover coupled to the outer ring of the bearing, as defined in the appended claims.

According to the invention, a housing seat is made on the outer ring for an annular sealing element of the o-ring type which allows the free deformation in axial direction, without any axial contact between annular sealing element and a sensor bearing element in the shape of cover, ensuring a radial sealing action between outer ring and metal sleeve of the cover at the same time so as to "close" only the first possible leakage path with the o-ring. The second path of possible leakage is instead closed by use of a sealant or an adhesive poured/provided between cylindrical metal sleeve and plastic made body of the cover, e.g. already during the step of manufacturing of the cover.

BRIEF DESCRIPTION OF THE DRAWINGS

The invention will now be described with reference to the accompanying drawings which illustrate a non-limitative embodiment thereof, in which.

DETAILED DESCRIPTION OF THE INVENTION

Figure 1:
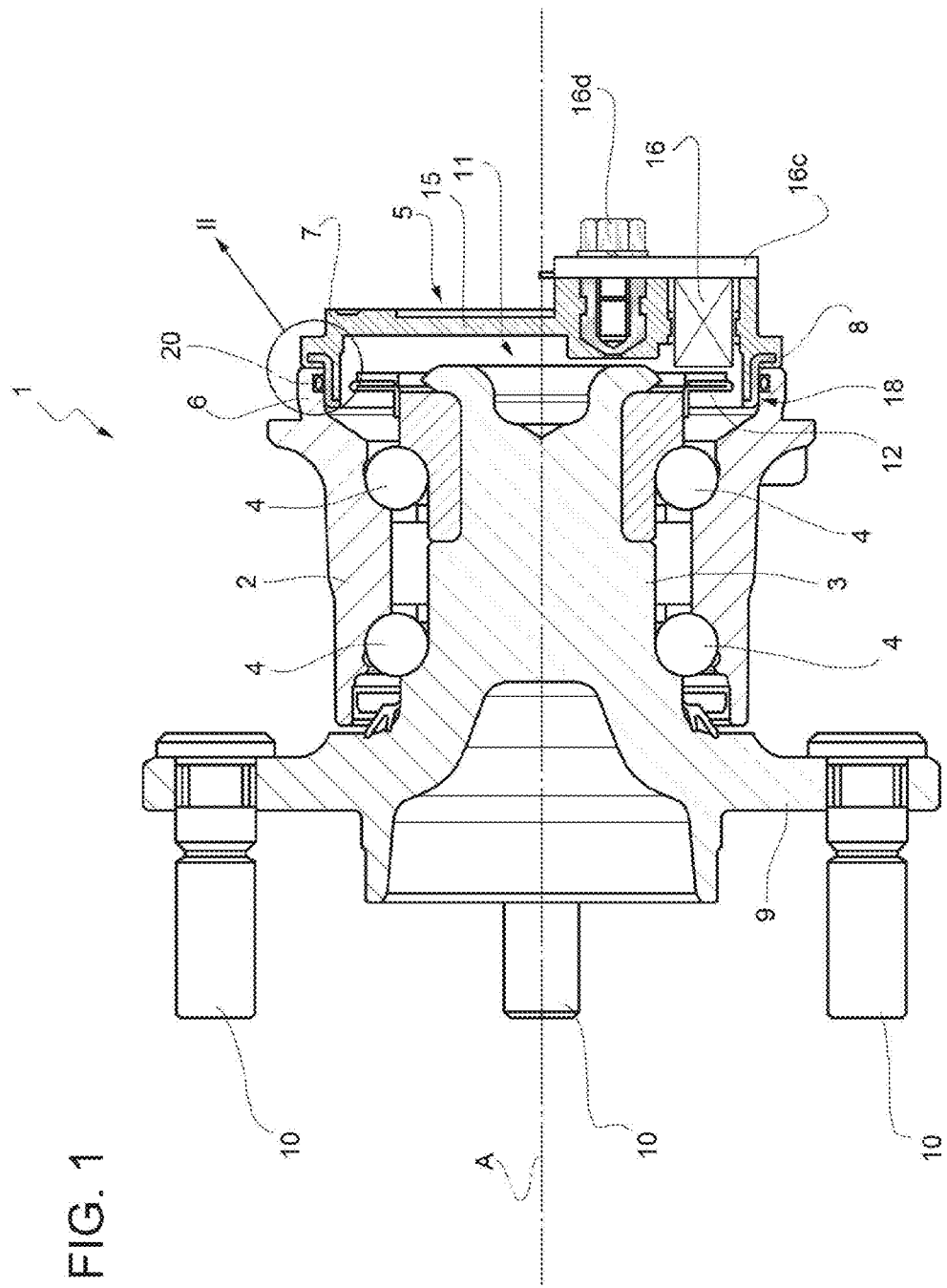
FIG. 1 diagrammatically shows an elevated view taken along a radial plane of a rolling bearing constituting a wheel hub bearing unit made according to the invention.
Figure 2:
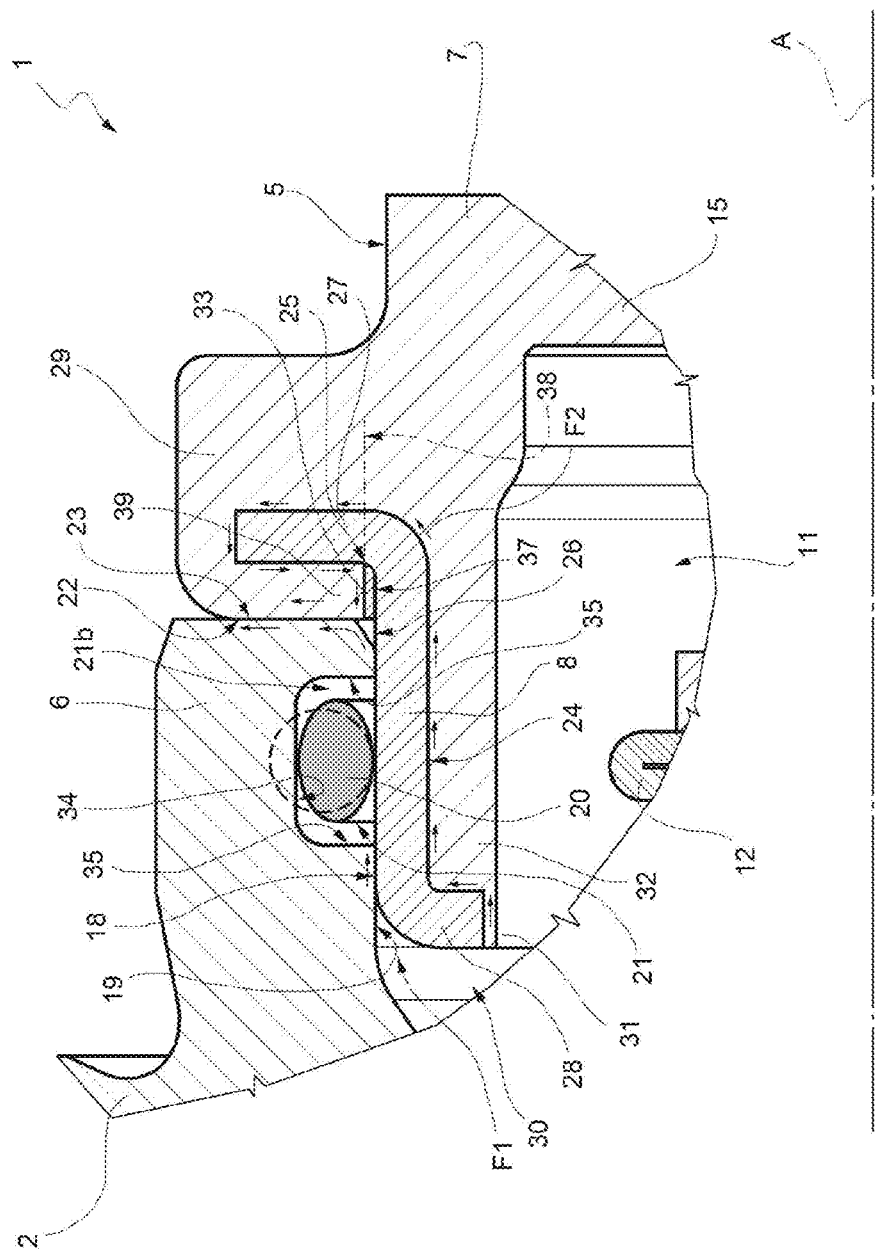
FIG. 2 shows a detail of the rolling bearing in FIG. 1 on enlarged scale.

With reference to FIGS. 1 and 2, reference numeral 1 indicates as a whole a rolling bearing, in particular defining in the preferred embodiment shown, a vehicle hub bearing unit, known in itself.

The rolling bearing 1 comprises an outer ring 2, stationary in use, an inner ring 3, rotating in use about a common symmetry axis A of the inner ring 3 and the outer ring 2, a plurality of rolling bodies 4 interposed between the inner ring 3 and the outer ring 2, and a closing and sealing cover 5, which fluid-tightly closes a first open annular end 6 of the outer ring 2; the cover 5 forms a sensor bearing element, as explained below.

The cover 5 is mounted in integral manner on the outer ring 2, driven in axial abutment and radial interference on the first end 6 and is formed (FIG. 2) by a plastic made body 7, made by molding of a synthetic plastic material, and a cylindrical metal sleeve 8, made of steel by pressing, for example, co-molded with the plastic made body 7.

In the example shown, the rolling bearing 1 is a wheel hub bearing unit, in which the inner ring 3 is equipped, on a side thereof opposite to the cover 5, with a flange 9 for mounting a vehicle wheel (known and not shown for the sake of simplicity) by means of screws or pins 10 carried by the flange 9.

A closed chamber 11 is delimited between the cover 5, the outer ring 2 and the inner ring 3, in which an element to be detected 12 or "phonic wheel" is housed, which element to be detected 12 is integrally carried by the inner ring 3 in position facing a bottom wall 15 of the cover or sensor bearing element 5, which supports a sensor 16 in protected manner (only diagrammatically shown with a block in FIG. 1), which sensor 16 is housed through the bottom wall 15, on which it is mounted by means of a flange 16c and of a screw 16d in the example shown; the sensor 16 (known) is adapted to detect the rotation speed of the vehicle wheel in cooperation with the element to be detected 12. The bottom wall 15 is arranged facing the open end 6 of the inner ring 2.

For the optimal operation of the sensor 16, the sensor bearing element 5 must be positioned with extreme accuracy with respect to the rings 2 and 3, in particular in an axial direction, i.e. parallel to axis A.

The metal sleeve 8 defines for this purpose at least one radial coupling radially outer lateral surface 18 of the sensor bearing element 5 with a radially inner lateral surface 19 of the outer ring 2; an elastically deformable annular sealing element 20 defined by an o-ring is further arranged between the sensor bearing element 5 and the outer ring 2, housed in an annular housing seat 21 obtained on the outer ring 2.

Figure 3:
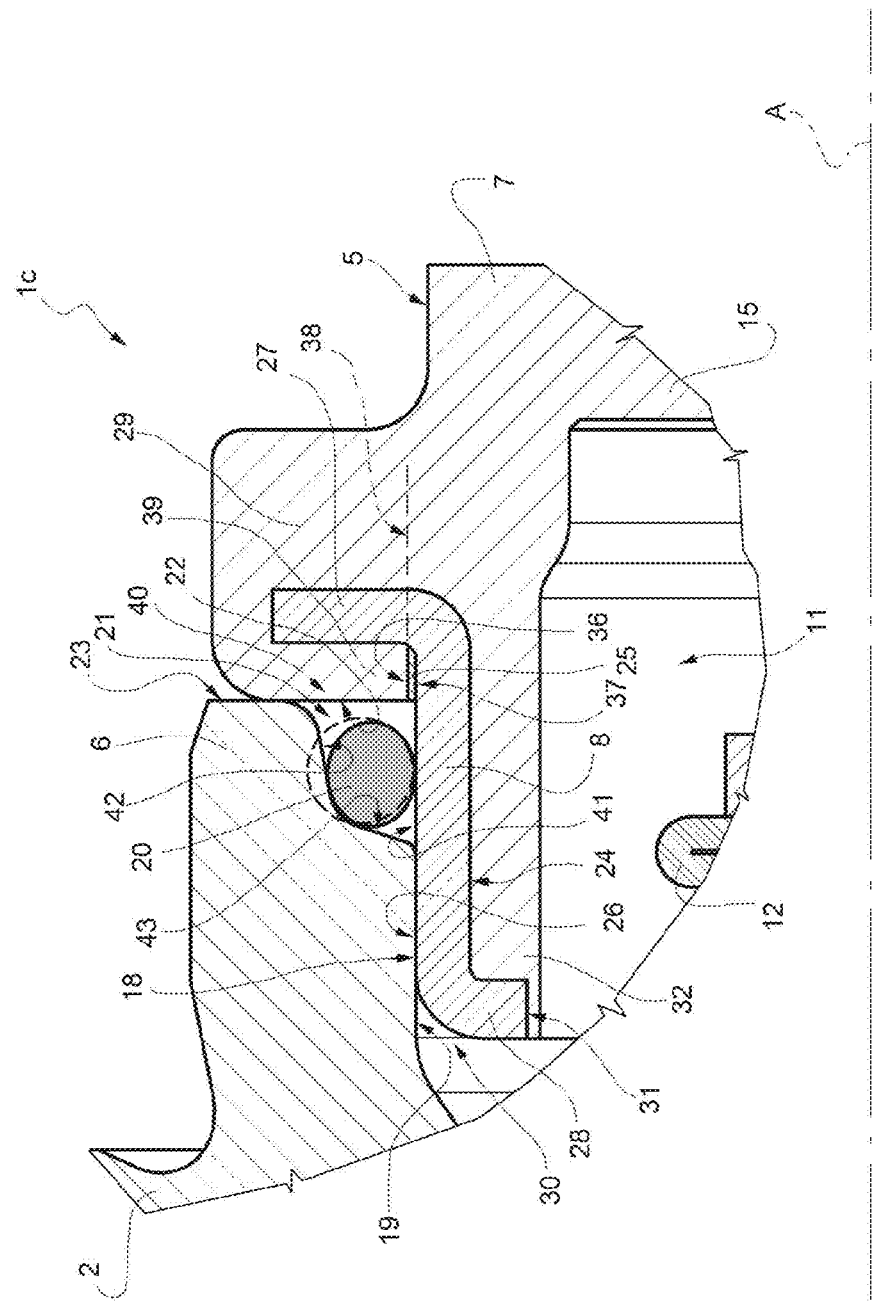
FIG. 3 shows, again on enlarged scale, the same detail as FIG. 2, but made according to a possible variant of the rolling bearing in FIG. 1.

In FIGS. 2 and 3, the o-ring 20 is shown with a dashed line in a non-deformed configuration and with a solid line in a deformed configuration. The housing seat 21 shown in FIG. 2 differs, as explained below, from the similar seat 21 present in a variant 1c of the rolling bearing 1 according to the invention, shown in FIG. 3 and which is described below.

With reference to FIG. 2, for a series of construction reasons known in the art, in the rolling bearing 1 there is a first passage F1 of possible leakage of the fluid, indicated by the arrows on the left side in FIG. 2, and a second passage F2 of possible leakage of fluid, indicated by the arrows on the right side in FIG. 2.

In particular, the passage F1 of possible leakage of fluid develops according to the arrows:

along radial interference coupling lateral surfaces between cover 5 and outer ring 2 defined by the radially inner surface 19 of the outer ring 2 and by the radially outer surface 18 of the cover 5; and along respective axial shoulder coupling surfaces between the sensor bearing cover 5 and the outer ring 2 defined by an axial shoulder frontal surface 22 of the sensor bearing cover 5 delimited by the plastic made body 7 and by a frontal surface 23 of the front end 6 of the outer ring 2.

Instead, the second passage F2 of possible leakage of fluid develops, according to the arrows, along a first contact interface between cylindrical metal sleeve 8 and plastic made body 7 defined by a radially inner lateral cylindrical surface 24 of the metal sleeve 8 and along a second contact interface defined by the frontal axial coupling between the axial shoulder coupling surfaces between the plastic made body 7 of the sensor bearing cover 5 and the outer ring 2 defined in turn, as indicated above for passage F1, by the axial shoulder frontal surface 22 of the sensor bearing cover 5 delimited by the plastic made body 7 and by the frontal surface 23 of the first end 6 of the outer ring 2.

According to the invention, the housing seat 21b for the annular sealing element 20 is made so as to allow a free deformation in axial direction of the annular sealing element 20, without any axial contact between annular sealing element 20 and sensor bearing cover 5.

Furthermore, in combination with the above, the housing seat 21b for the annular sealing element 20 is made at least in part at the radially inner lateral surface 19 of the outer 2 and has radial dimensions such to ensure a radial sealing action between outer ring 2 and metal sleeve 8 of the sensor bearing cover 5 determined by the annular sealing element 20, which is inserted radially by interference between the seat 21b and the radial coupling radially outer lateral surface 18 of the sensor bearing cover 5, delimited by the sleeve 8, so that the annular sealing element 20, as apparent in FIG. 2, cuts off only the first passage F1 of possible fluid leakage being arranged in series along the latter.

Again in combination with the above, a sealant or adhesive 25 is instead arranged to close the second passage F2 of possible leakage of fluid, being arranged in series along the latter.

According to the embodiment in FIG. 2, the cylindrical metal sleeve 8 is delimited between a radially outer lateral cylindrical surface 26 defining at least one radial coupling lateral element 18 of the sensor bearing element in the shape of cover 5 and its radially inner lateral cylindrical surface 24 defining the contact interface between cylindrical metal sleeve 8 and plastic made body 7.

Furthermore, the cylindrical metal sleeve 8 is provided with a first end 27 distal from the outer ring 2, radially folded outwards in an L-shape and with a second end 28, vicinal to the outer ring 2, opposite to the distal end 27 and radially folded inwards in an L-shape.

The end 27 is completely embedded in a first, flange shaped, portion 29 of the plastic made body 7; the flange portion 29 delimits the axial shoulder frontal surface 22 of the sensor bearing cover 5; conversely, the end 28 defines towards the outer ring 2, according to an aspect of the invention, a metal frontal end 30 of the sensor bearing cover 5 and has a radially inner edge 31 embedded in (and thus covered by) a second, sleeve shaped, portion 32 of the plastic made body 7; the second portion 32 of the plastic made body 7 extends parallel to the metal sleeve 8 and in contact with the radially inner lateral surface 24 of the metal sleeve 8; furthermore, the portions 29 and 32 are obtained integral in one piece with one another and with the bottom wall 15 of the sensor bearing cover 5 which is an integral part of the plastic body 7.

The described conformation of the metal sleeve 8, and consequently of the sensor bearing element 5 in the shape of cover and considered as a whole, facilitates in use the driving by interference the radial coupling portion of the sensor bearing cover 5 defined by the metal sleeve 8.

Finally, according to an aspect of this embodiment of the invention, a sealant 25 is used to lock/close the second passage/path F2 of possible leakage, which sealant forms a layer 33 interposed between the cylindrical metal sleeve 8 and the plastic made body 7 and which is poured, preferably already during the step of manufacturing of the sensor bearing element 5 in the shape of cover, between the cylindrical metal sleeve 8 and the plastic made body 7, precisely.

The described conformation of the sensor bearing cover 5 is used, according to the invention, in combination with a specific conformation of the housing seat 21 for the sealing annular element 20, already briefly described above.

In particular, the seat 21 of the bearing 1 is obtained entirely and only on the radially inner lateral surface 19 of the outer ring 2 and is defined by a annular groove 21b delimited by an annular bottom wall 34 facing the radially outer lateral cylindrical surface 26 of the metal sleeve 8 defining the at least radial coupling lateral surface 18 of the sensor bearing cover 5, and by a pair of opposite end faces 35, facing each other and parallel to the frontal surface 23 of the end 6 of the outer ring 2, faces 35 which, in the example shown, are joined with a wide radius of curvature with the bottom wall 34.

The annular sealing element 20 as indicated consists of an elastically deformable o-ring, which according to this embodiment, is radially inserted by interference between the annular bottom wall 34 of the annular groove 21b and the radially outer lateral surface 26 of the metallic sleeve 8; in this manner, the o-ring 20 remains only inserted between two opposite metal steel surfaces, which allows to obtain an optimal control of the compression ratio to which the o-ring 20 is subjected in use ensuring an optimal hydraulic sealing also in presence of dimensional variations consequent to the machining tolerances or thermal deformations.

Furthermore, the seat defined by the groove 21b is made so that there is a predetermined axial clearance, which allows the sealing element 20 to be deformed in controlled, predictable manner by virtue of the absence of obstacles, between the annular sealing element 20 and both end faces 35 facing each other.

FIG. 3 shows the same detail in FIG. 2 of a rolling bearing 1c which constitutes a variant of the rolling bearing 1 described hereto. Details similar or equivalent to those of bearing 1 will be indicated for the sake of simplicity with the same reference numbers.

Bearing 1c is substantially identical to bearing 1 described above and differs from it only for some constructive details in relation to the seat 21 for the sealing element 20; indeed, in the bearing 1c, the second path F2 of possible leakage is closed by means of a sealant 25, which is poured between the cylindrical metal sleeve 8 and the plastic made body 7 of the cover 5, preferably already during a step of manufacturing of the cover 5 itself, as described above.

Therefore, the cover 5 of the bearing 1c is identical to the cover 5 described above for bearing 1, and in particular the conformation of the metal sleeve 8 and of the plastic made body 7, are identical and therefore will no longer be described referring to that described for bearing 1.

In bearing 1c, as also in bearing 1 described above, the sealant 25 forms an annular cordon 36 (cordon 33 in bearing 1) arranged between a portion 37 of the radially outer cylindrical lateral surface 26 of the metal sleeve 8 (FIGS. 2 and 3), which portion 37 is immediately adjacent to the distal end 27, and a base 38 of the flange shaped portion 29 of the plastic made body 7, which base is ideally indicated with a dashed line in FIGS. 2 and 3, in particular between the surface portion 37 of surface 26 and a stretch 39 of the base 38 of the flange portion 29 comprised between the frontal surface 22 and the distal end 27, which is incorporated in the flange portion 29.

In the rolling bearing 1c the housing seat 21 for the annular sealing element 20 is obtained straddling the surfaces 23 and 19; in particular, the seat 21 is obtained: in part on the length of an annular stretch 40 of the frontal surface 23 of the end 6 of the outer ring 2, immediately adjacent to the radially inner lateral surface 19 of the outer ring 2; and in part on the length of a stretch 41 of the radially inner lateral surface 19 of the outer ring 2, immediately adjacent to the end 6.

Furthermore, the housing seat 21 of the bearing 1c is delimited by a pair of annular flat surfaces 42 and 43 arranged obliquely to the rotation axis A and converging with, and joined to, each other, facing, respectively, surface 42 the radially outer lateral surface 26 of the metal sleeve 8 and surface 43 the axial shoulder frontal surface 22 of the sensor bearing element 5 delimited by the plastic made body 7.

As in bearing 1 in FIGS. 1 and 2, the annular sealing element 20 is constituted by an elastically deformable o-ring, which here is radially inserted by interference between the first flat and oblique annular surface 42 of the seat 21 and the outer radially lateral surface 26 of the metal sleeve 8, while there is a predetermined axial clearance between the annular sealing element 20 and the axial shoulder frontal surface 22 of the cover 5 delimited by the plastic made body 7.

Also in this case, the o-ring 20 remains only inserted between two opposite metal steel surfaces, in the case in point the surfaces 42 and 26, which allows to obtain an optimal control of the compression ratio to which the o-ring 20 is subjected in use ensuring an optimal hydraulic sealing also in presence of dimensional variations consequent to the machining tolerances or thermal deformations. Similarly, the predetermined axial clearance which remains between cover 5 and o-ring 20 by virtue of the conformation of the seat 21 allows the sealing element 20 to be deformed in controlled, predictable manner by virtue of the absence of obstacles.

All the objects of the invention are thus reached.

The invention claimed is:

1. A rolling bearing, in particular a vehicle hub bearing unit, comprising:
   an outer ring, stationary in use;
   an inner ring, rotating in use about a common symmetry axis of the inner ring and the outer ring;
   a plurality of rolling bodies interposed between the inner and outer rings; and
   a sensor bearing element, in the shape of a closing and sealing cover, which fluid-tightly closes a first open annular end of the outer ring, wherein the sensor bearing element is mounted integral with the outer ring, driven in axial abutment and radial interference on the first end of the outer ring, and being formed by a plastic made body, made of a synthetic plastic material, and by a cylindrical metal sleeve, co-molded with the plastic made body, which metal sleeve defines at least one radially outer, radial coupling lateral surface of the sensor bearing element with a radially inner lateral surface of the outer ring;

wherein between the sensor bearing element and the outer ring there being arranged an annular sealing element housed in a seat obtained on the outer ring, there being present in the bearing:

a first passage of possible leakage of fluid along the radially inner, radial coupling lateral surface of the outer ring and the radially outer, radial coupling lateral surface of the sensor bearing element, and along respective axial coupling surfaces in abutment between the sensor bearing element and the outer ring defined by an axial shoulder frontal surface of the sensor bearing element delimited by the plastic made body and by a frontal surface of the first end of the outer ring, and a second passage of possible leakage of fluid along a first contact interface between the cylindrical metal sleeve and the plastic made body and along a second contact interface between the axial shoulder coupling surfaces between the plastic made body of the sensor bearing element and the outer ring, a sealant is arranged to close the second passage of possible leakage of fluid, wherein:
i) the housing seat for the annular sealing element is made so as to allow a free deformation in axial direction of the annular sealing element, without any axial contact between annular sealing element and sensor bearing element;
ii) the housing seat for the annular sealing element is made at least in part at the radially inner lateral surface of the outer ring and its radial dimensions are such to ensure a radial sealing action between the outer ring and the metal sleeve of the sensor bearing element, the annular sealing element being radially interference fitted between the housing seat and the radially outer, radial coupling lateral surface of the sensor bearing element;
iii) so that the annular sealing element cuts off only the first passage of possible leakage of fluid.

2. A rolling bearing according to claim 1, wherein the second path of possible leakage is closed by the sealant, wherein the sealant is poured between the cylindrical metal sleeve and the plastic made body of the sensor bearing element.

3. A rolling bearing according to claim 2, wherein, in combination:

the cylindrical metal sleeve is delimited between a radially outer cylindrical lateral surface thereof defining the at least one radial coupling lateral surface of the sensor bearing element and a radially inner cylindrical lateral surface thereof defining the first contact interface between cylindrical metal sleeve and plastic made body;

the cylindrical metal sleeve is provided with: a distal end from the outer ring, radially folded outwards in an L-shape, which is completely embedded in a first flange-shaped portion of the plastic made body, such a first portion of the plastic made body delimiting the axial shoulder frontal surface of the sensor bearing element; and a vicinal end to the outer ring, opposite to the distal end and radially folded inwards as an L, which defines a metal frontal end of the sensor bearing element towards the outer ring and which has a radially inner edge embedded in a second sleeve-shaped portion of the plastic made body; the second portion of the plastic made body extending parallel to the metal sleeve and in contact with the radially inner lateral surface of the metal sleeve; the first and the second portion of the plastic made body being made integrally in one piece with each other and with a bottom wall of the plastic made body arranged facing the first open end of the outer ring; and the sealant forms an annular cordon arranged between a portion of the radially outer cylindrical lateral surface of the metal sleeve immediately adjacent to the distal end of the metal sleeve and a base of the first flange-shaped portion of the plastic made body.

4. A rolling bearing according to claim 2, wherein:

a housing seat for the annular sealing element is obtained in part on the extension of a stretch of the frontal surface of the first end of the outer ring and in part on the extension of a stretch of the inner lateral surface of the outer ring immediately adjacent to the first end of the outer ring;

the housing seat is delimited by a pair of annular flat surfaces arranged obliquely to the rotation axis and converging with, and joined to, each other, one facing the radially outer lateral surface of the metal sleeve and the other facing the axial shoulder frontal surface of the sensor bearing element delimited by the plastic made body, respectively;

the annular sealing element consists of an elastically deformable o-ring inserted radially by interference between the oblique first annular flat surface of the housing seat and the radially outer lateral surface of the metal sleeve; and a predetermined axial clearance is present between the annular sealing element and the axial shoulder frontal surface of the sensor bearing element delimited by the plastic made body.

5. A rolling bearing according to claim 2, wherein:

the housing seat for the annular sealing element is obtained only on the radially inner lateral surface of the outer ring;

the housing seat is defined by an annular groove delimited by an annular bottom wall facing the radially outer cylindrical lateral surface of the metal sleeve defining the at least one radial coupling lateral surface of the sensor bearing element, and by a pair of opposite end faces facing each other and parallel to the front surface of the first end of the outer ring;

the annular sealing element consists of an elastically deformable o-ring radially interference fitted between the annular bottom wall of the annular groove and the radially outer lateral surface of the metal sleeve; and a predetermined axial clearance is present between the annular sealing element and both end faces of the annular groove facing each other.

6. A rolling bearing according to claim 1, wherein the second path of possible leakage is closed by the sealant, wherein the sealant is poured between the cylindrical metal sleeve and the plastic made body of the sensor bearing element during a step of manufacturing of the sensor bearing element.

7. A rolling bearing according to claim 1, wherein the inner ring is equipped on a side thereof opposite to the sensor bearing element with a flange for the assembly of a vehicle wheel.

8. A rolling bearing according to claim 7, wherein a closed chamber is delimited between the sensor bearing element in the shape of a cover, the outer ring and the inner ring, in which an element to be detected is housed,
- wherein the element to be detected is integrally carried by the inner ring in position facing a bottom wall of the sensor bearing element,
- wherein the bottom wall of the sensor bearing element supports a sensor in protected manner, facing the inside of the closed chamber,
- wherein the sensor is adapted to detect the rotation speed of the vehicle wheel in cooperation with the element to be detected.

* * * * *